United States Patent [19]

Steeby et al.

[11] Patent Number: 5,252,861
[45] Date of Patent: Oct. 12, 1993

[54] STARTER INTERLOCK FOR ELECTRONICALLY CONTROLLED VEHICLE

[75] Inventors: Jon A. Steeby, Schoolcraft; Steven H. LaPointe, Portage, both of Mich.

[73] Assignee: Eaton Corporation, Cleveland, Ohio

[21] Appl. No.: 732,015

[22] Filed: Jul. 18, 1991

[51] Int. Cl.$^5$ .......................... F02N 17/00; F02P 9/00
[52] U.S. Cl. ................. 307/10.6; 123/179.23
[58] Field of Search ..................... 307/10.6; 290/38 R; 123/179.1, 179.3, 179.4, 179.18, 179.23

[56] References Cited

U.S. PATENT DOCUMENTS

| | | | |
|---|---|---|---|
| 4,479,472 | 10/1984 | Shimamura | 123/340 |
| 4,862,010 | 8/1989 | Yamamoto | 290/38 R |
| 4,896,637 | 1/1990 | Yamamoto | 123/179.1 |

Primary Examiner—A. D. Pellinen
Assistant Examiner—Richard T. Elms
Attorney, Agent, or Firm—C. H. Grace

[57] ABSTRACT

In a vehicle in which the engine is started from a battery and in which a safety interlock prevents starting if the transmission is not in neutral, the safety interlock is of a type that latches into a condition that enables cranking to continue even when the battery voltage becomes so low that some of the control circuits would not work properly. The interlock is latched when a start command occurs if the transmission is in neutral and the clutch is disengaged. The interlock remains latched until the start command ceases. Limited automatic control of the engine's throttle can also be provided during cranking. If desired, the safe status of the transmission and clutch can continue to be monitored during the cranking and the interlock can be unlatched if the transmission or clutch becomes engaged.

5 Claims, 6 Drawing Sheets

PRIOR ART
FIG. 1

TRUTH TABLE FOR BOTH FLIP-FLOPS AS CONNECTED IN FIRST EMBODIMENT

| STATES | | RESETS | CLOCKS | | OUTPUTS | |
|---|---|---|---|---|---|---|
| $K_1$ | $K_2$ | $R_1$ & $R_2$ | $CK_1$ | $CK_2$ | $Q_1$ | $Q_2$ |
| 2 | 2 | L | H | H | L | L |
| 4 | 4 | H | H | H | H | H |
| 4 | 8 | H | H | L | H | L |
| 7 | 7 | H | H | H | L | L |
| 8 | 8 | H | L | L | L | L |

TRUTH TABLE FOR EACH FLIP-FLOP

| STATE K | SET S | RESET R | CLOCK CK | DATA D | OUTPUTS Q | $\overline{Q}$ |
|---|---|---|---|---|---|---|
| 1 | L | H | X | X | H | L |
| 2 | H | L | X | X | L | H |
| 3 | L | L | X | X | H* | H* |
| 4 | H | H | ╱ | H | H | L |
| 5 | H | H | ╱ | L | L | H |
| 6 | H | H | L | X | NC | NC |
| 7 | H | H | H | X | NC | NC |
| 8 | H | H | ╲ | X | NC | NC |

L = LOW ; H = HIGH ; X = DOESN'T MATTER

╱ = RISING ; ╲ = FALLING; NC = NO CHANGE

\* BOTH OUTPUTS WILL REMAIN HIGH AS LONG AS SET AND RESET ARE LOW, BUT THE OUTPUT STATES ARE UNPREDICTABLE IF SET AND RESET GO HIGH SIMULTANEOUSLY.

Fig. 3

SEQUENCE OF NORMAL OPERATION

| STEP | CK1 | CK2 | START SWITCH | R1 AND R2 | FF1 STATE | FF2 STATE | Q1 | Q2 |
|---|---|---|---|---|---|---|---|---|
| 1 | H | H | OPEN | L | 2 | 2 | L | L |
| 2 | H | H | CLOSED | H | 7 | 7 | L | L |
| 3 | L | L | CLOSED | H | 8 | 8 | L | L |
| 4 | H | L | CLOSED | H | 4 | 8 | H | L |
| 5 | H | H | CLOSED | H | 4 | 4 | H | H |
| 6 | H | H | OPEN | L | 2 | 2 | L | L |

| STATE | KEY START | SAFETY SIGNAL | ABORT-START | STARTER ACTIVE |
|---|---|---|---|---|
| 1 | 0 | 0 | 0 | 0 |
| 2 | 0 | 1 | 0 | 0 |
| 3 | 0 | 0 | 1 | 0 |
| 4 | 0 | 1 | 1 | 0 |
| 5 | 1 | 0 | 0 | 0 |
| 6 | 1 | 0 | 1 | 0 |
| 7 | 1 | 1 | 0 | 1 |
| 8 | 1 | 1 | 1 | 0 |

STARTER INTERLOCK FOR ELECTRONICALLY CONTROLLED VEHICLE

FIELD OF THE INVENTION

The invention relates to engine-powered vehicles having a gear-change transmission, in which the engine is started from an electric power source, and in which a safety interlock is provided to enable or prevent engine starting in response to a sensor that senses a neutral status of the transmission.

SUMMARY OF THE INVENTION

Modern vehicles often have an automatic or semi-automatic transmission that is controlled by an electronic control unit (ECU) that includes a special-purpose microcomputer. One function of the ECU is to control a safety interlock circuit that permits engine cranking by a starter only when the ECU senses that conditions are safe to start the engine. For example, the ECU may monitor feedback signals from the transmission and clutch, and control the interlock to permit cranking of the engine only when the transmission is in neutral and the clutch is disengaged.

However, a starter motor ordinarily draws a very large current that causes the battery voltage to decrease to a low value. Low battery voltage during cranking may affect the ECU in such a way that it acts (through the interlock) to interrupt cranking of the engine even when the battery voltage is still high enough that it would have been able to crank the engine and start it successfully if not interrupted.

The present invention involves a method and apparatus wherein, after safe conditions are sensed by the ECU, the safety interlock is latched to a condition that enables cranking (and the ECU control system is latched to maintain the safe conditions) while the engine cranks. The latched condition persists throughout the cranking process, or if desired, can unlatch if somehow an unsafe condition arises during cranking.

Accordingly, one object of the present invention is to provide a method for starting an engine involving the steps of sensing whether the transmission is in neutral and providing a safety signal indicating whether or not it is safe to start the engine, and sending both the safety signal and a start-switch signal to an interlock device, which latches in a position to commence cranking and to maintain it until the start-switch signal ceases.

A second object is to provide a method in which a clutch-status signal is also generated, which, if the clutch is engaged, inhibits the safety signal from indicating that it is safe to start.

Another object is to provide a method involving steps of communicating information to the ECU that a start-switch signal is being provided and enabling the safety signal to indicate to the interlock that it is safe to start the engine if the transmission-status signal shows that the transmission is in neutral.

Another object is to provide a method in which, when the transmission is in neutral, the ECU is prevented from commanding the transmission to change its safe status so long as the crank command is maintained.

Another object is to provide a method as above and including the step of preventing the ECU from changing the safe status of the transmission, and yet permitting automatic control of a throttle in a limited way, while the crank command is maintained.

Another object is to include a further step of maintaining the crank command through the interlock device despite severe reduction of battery voltage during cranking, by supplying power for the interlock device from either of two paths, at least one of which is capable of maintaining the interlock even when battery voltage is at a low level.

Another object is to provide a method as above and having the additional step of continuing to sense whether the transmission is in neutral during the cranking, and stopping the cranking if the transmission-status signal starts showing that the transmission is not in neutral.

Other objects of the invention are to provide apparatus for starting an engine of a vehicle, which automatically performs the steps of the methods described above.

Other objects of the invention will be apparent from the drawings, description, and claims describing the invention.

DESCRIPTION OF PREFERRED EMBODIMENTS

Prior Art

Figure 1:
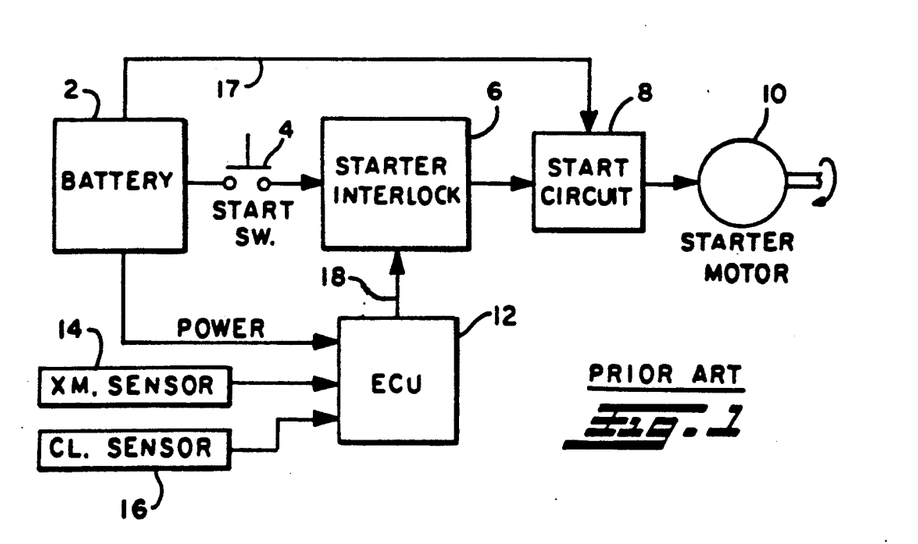
FIG. 1 is a simplified block diagram of one form of prior art that includes a starter-interlock circuit.

One type of prior-art apparatus is described before the preferred embodiments are described in order to make clear what is new in the invention. In FIG. 1, a prior art starting system for a vehicle includes a battery 2, a start switch 4, a starter interlock 6, starter circuitry 8, a starter motor 10, an electronic control unit (ECU) 12, a transmission-status sensor 14, and a clutch-status sensor 16. The battery 2 is connected to the start switch 4, whose output is connected to the starter interlock 6, which is an electronically controllable switch.

The output of the starter interlock 6 is connected to the starter circuitry 8, which includes a solenoid that connects and disconnects battery voltage (line 17) to the starter motor 10. The starter motor 10 is connected through a mechanical disengagement device and gearing (not shown) to the engine of the vehicle.

The ECU 12 has numerous outputs that are not shown in FIG. 1, but one output that is shown is a start/no-start control line 18 connected from the ECU 12 to the starter interlock device 6. It is capable of actuating the starter interlock 6 to convey a start-switch signal from the start switch 4 to the starter circuitry 8.

In the operation of the prior art circuit of FIG. 1, when the start switch 4 is closed, if the starter interlock 6 is also closed a command voltage is conducted through the starter interlock 6 to the starter circuitry 8, which then connects (17) power from the battery 2 to the starter motor 10 to start the engine.

The starter interlock 6 is closed when the ECU 12 has commanded it to close, which it does only if the transmission-status sensor 14 and the clutch-status sensor 16 are providing safe-condition signals to the ECU 12. Safe-condition signals are indications that the transmission is in neutral and the clutch is disengaged. If either of these conditions is not met the starter interlock device 6 is open and the starter circuitry 8 does not receive a command to start the engine.

With this prior-art type of circuit, a problem, which has been approached in various ways in the past, is that when the starter motor 10 starts cranking the engine it draws so much current from the battery 2 that the battery voltage diminishes greatly, and the ECU 12 does not receive enough power to operate properly. The ECU 12 may then send a no-start signal on the control line 18 to the starter interlock 6, causing the starter interlock 6 to open. Current to the starter motor is then interrupted, perhaps before the engine has had time to start. This problem is solved by the invention, and the performance of starting equipment is further improved by the invention in several other ways as described below.

Connections of First Embodiment

Figure 2:
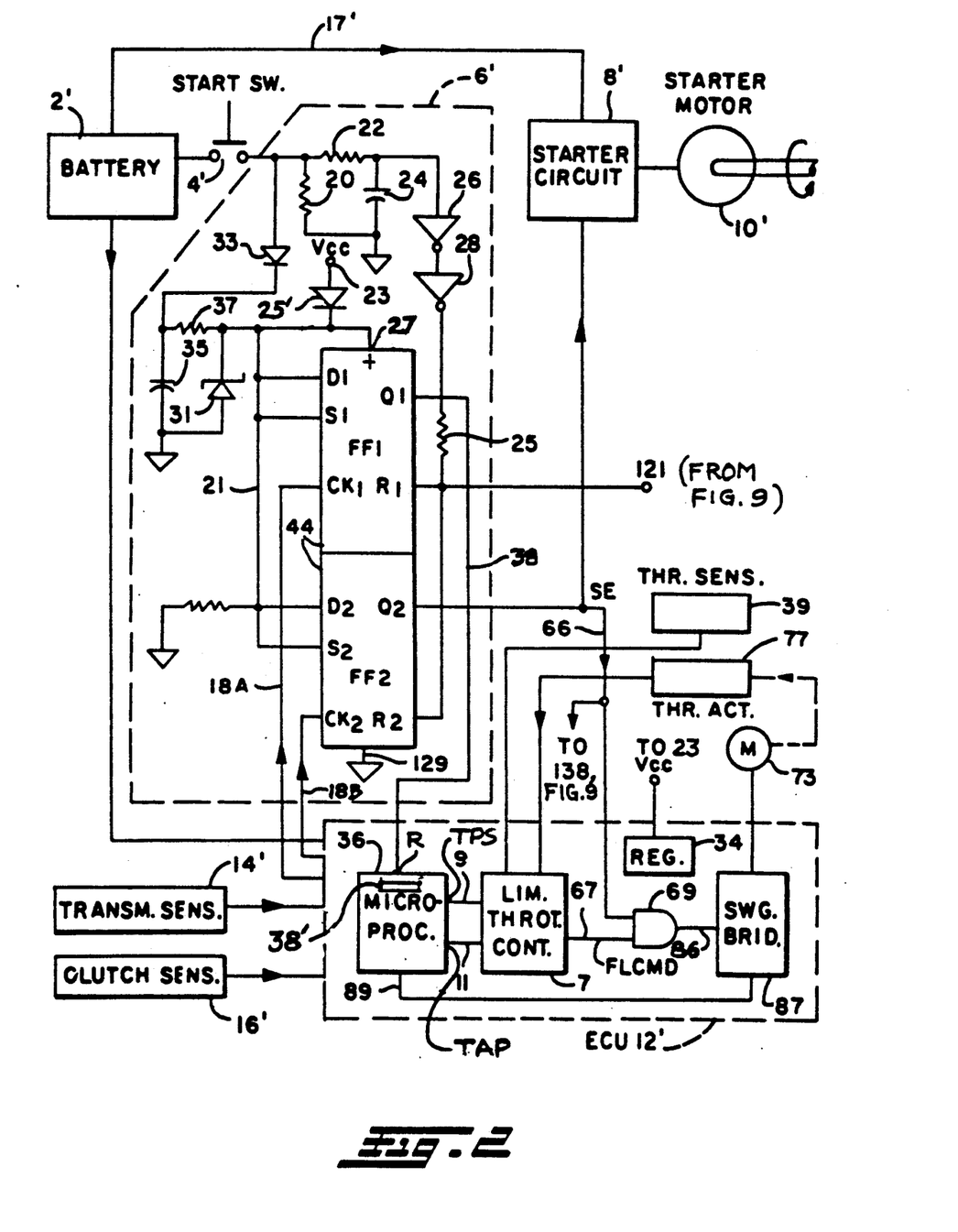
FIG. 2 is a simplified block diagram of a first preferred embodiment of the invention.

In FIG. 2 a first preferred embodiment of the invention is shown. A battery 2' is connected to a start switch 4' that is manually actuable by an ignition key. The output of the start switch 4' connects to an interlock circuit 6', which is shown in dotted lines. Within the interlock 6' the start-switch signal is connected to a filter comprising a shunt resistor 20, a series resistor 22, and a shunt capacitor 24. The capacitor 24 ensures that the system is initially in a correct state when the power is turned on.

The signal from the filter capacitor 24 is applied to two inverting amplifiers 26, 28 connected in cascade, which process the signal to establish unambiguous on and off signal levels. From the invertor 28 a reset signal line is connected through a resistor 25 to both of the reset terminals R1 and R2, respectively, of two semiconductor flip-flop circuits FF1, FF2. Both FF1 and FF2 are incorporated in a chip 44, which is a Model MC74HC74N manufactured by Motorola Corporation of Schaumburg, Ill.

An output signal from a terminal Q2 of the flip-flop FF2 is connected to the starter circuitry 8', which controls the connection and disconnection of battery current on a line 17' to a starter motor 10'.

Figure 6:
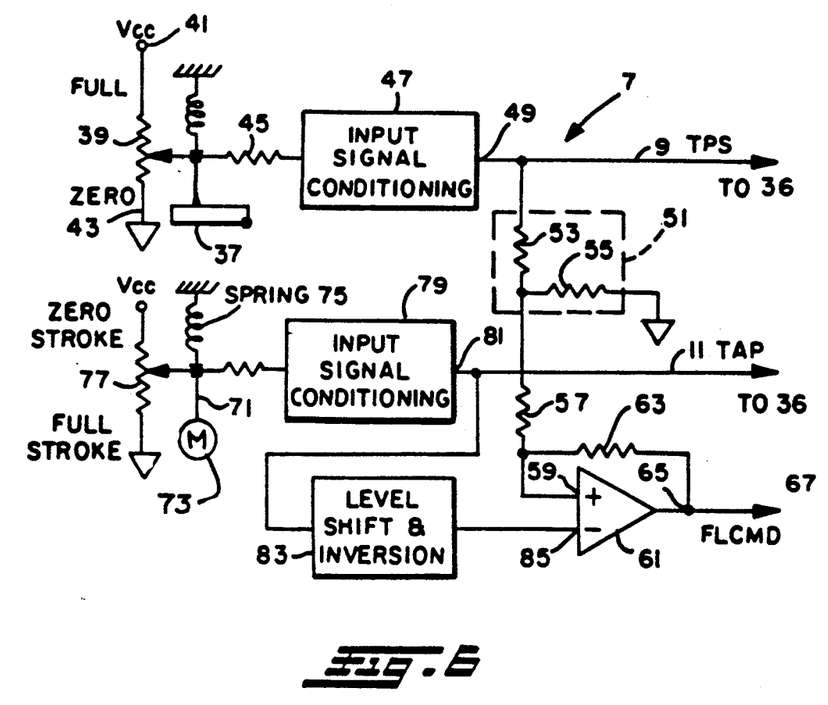
FIG. 6 is a more detailed diagram of a portion of the first embodiment of the invention that provides limited automatic control of the throttle of the vehicle by the ECU while a starter motor cranks the engine.

Another output connection 66 (labelled SE) from terminal Q2 goes to a fuel-motor-control-circuit and-gate 69, which is within an ECU 12'. Details of block 7 are shown in FIG. 6 and are described later.

The signal SE enters one input of a two-input AND gate 69. Another input 67 of the AND gate 69 is received along a line labelled FLCMD from block 7. The output of the AND gate 69 is connected to a conventional switching bridge 87 whose outputs control an electric motor 73. The motor 73 can be operated in forward and reverse directions to control the setting of a throttle actuator, as is described in more detail below.

An output connection 9 carries a throttle-pedal-sensor-feedback signal from block 7 to a terminal TPS of a microprocessor 36, which is also within the ECU 12'. The microprocessor 36 is a Model 8097 manufactured by Intel Corporation of Santa Clara, Calif. Another feedback line 11 conducts a throttle-actuator-feedback signal from block 7 to a terminal TAP of the microprocessor 36. The FLCMD signal and the SE signal are for control of the throttle during starting of the engine, while the TPS and TAP lines 9 and 11 are for normal throttle control after the engine has been started.

Continuing with FIG. 2, the ECU 12' receives a transmission-status signal from a neutral sensor 14' and a clutch-status signal from an engagement sensor 16'. Separate output lines 18A and 18B connect to clock terminals CK1 and CK2, respectively, of the flip-flops FF1 and FF2.

A power supply terminal 23 (VCC) derives power indirectly from the battery 2' through a conventional regulated power supply 34 in the ECU 12'. Current is conducted from terminal 23 through a diode to a load terminal 27 of the chip 44. A ground terminal 29 is also connected to the chip 44. A Zener diode 31 is connected in shunt from the terminal 27 to ground to protect the chip 44 from excessive voltage.

The D1 and S1 terminals of FF1 and the D2 and S2 terminals of FF2 are connected on a line 21 to terminal 27.

An alternative path for power for the interlock circuit is provided in addition to that supplied at terminal 23. The alternative path is from the battery 2' through the start switch 4' and through a diode 33. The cathode of the diode 33 connects to a shunt-connected capacitor 35 and also to a series-connected resistor 37. The other end of resistor 37 is connected to the terminal 27.

The relatively light current drawn by the regulator diode 31 and FF1 and FF2 can be supplied through either the diode 25' or the diode 33 depending upon the relative voltage levels of the two paths. Diodes 25' and 33 serve as an OR gate whose behavior is somewhat modified by the peak-reading capacitor 35 and the series resistor 37.

Figure 3:
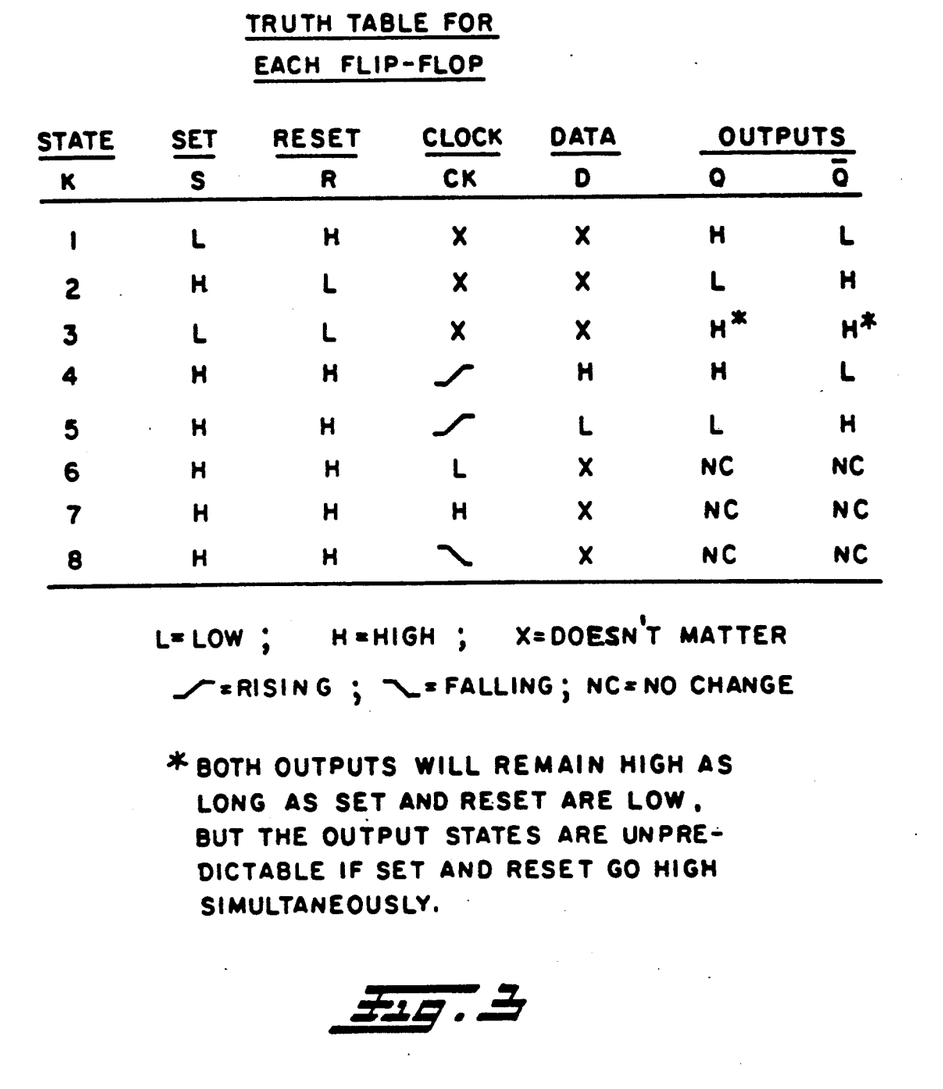
FIG. 3 is a truth table applicable to each of two bistable flip-flops of the type that are employed in the first embodiment.

A truth table for FF1 is shown in FIG. 3; a truth table for FF2 would be identical. Because of the way the two flip-flops are connected by external circuitry in FIG. 2, the states 1, 3, 5 and 6 are not used during normal starting operation of this circuit.

Figure 4:
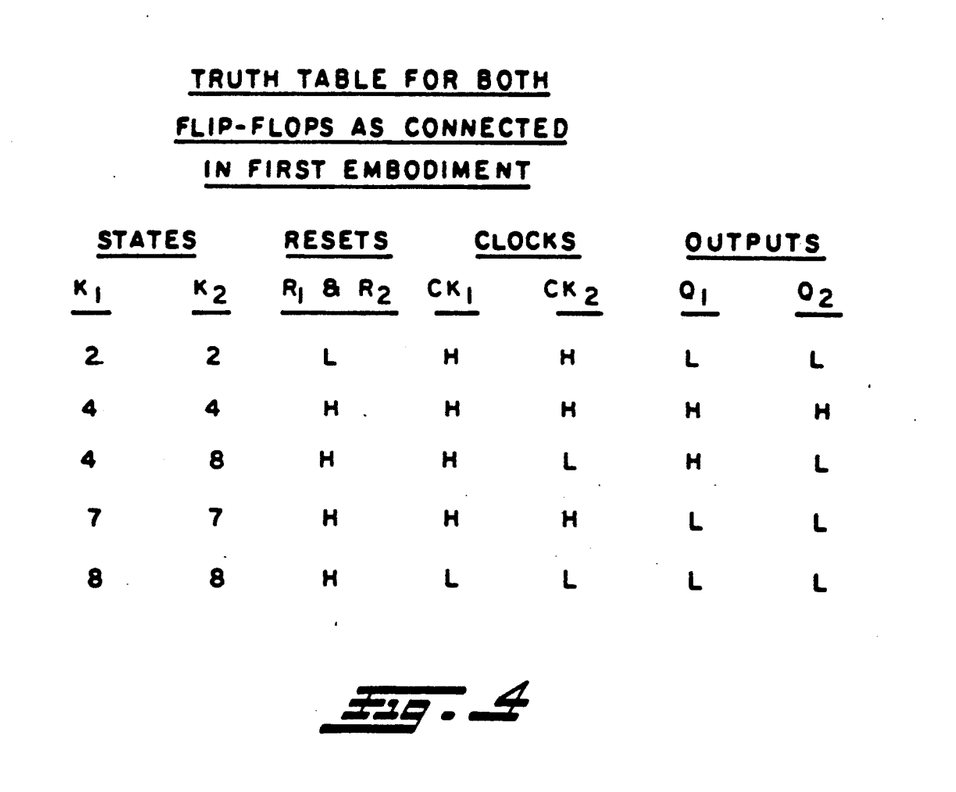
FIG. 4 is a truth table for both of the flip-flops when they are together on one chip as in the first embodiment.

FIG. 4 is a truth table for FF1 and FF2 together, showing their behavior when they are connected as in the first embodiment. K1 is the state of flip-flop 1 and K2 is the state of flip-flop 2. Reset R1 always has the same signal as reset R2 because they are connected together. State 2 exists at both FF1 and FF2 when the resets R1 and R2 are low. For all other states R1 and R2 are high.

State 4 exists at both flip-flops when CK1, CK2, Q1 and Q2 are all high. State 4 exists at FF1 and state 8 at FF2 when CK1 is high and CK2 is low. State 7 exists at both FF1 and FF2 when CK1 and CK2 are high, making Q1 and Q2 low. State 8 exists at both flip-flops when CK1, CK2, Q1, and Q2 are all low.

Normal Operation of First Embodiment

Figure 5:
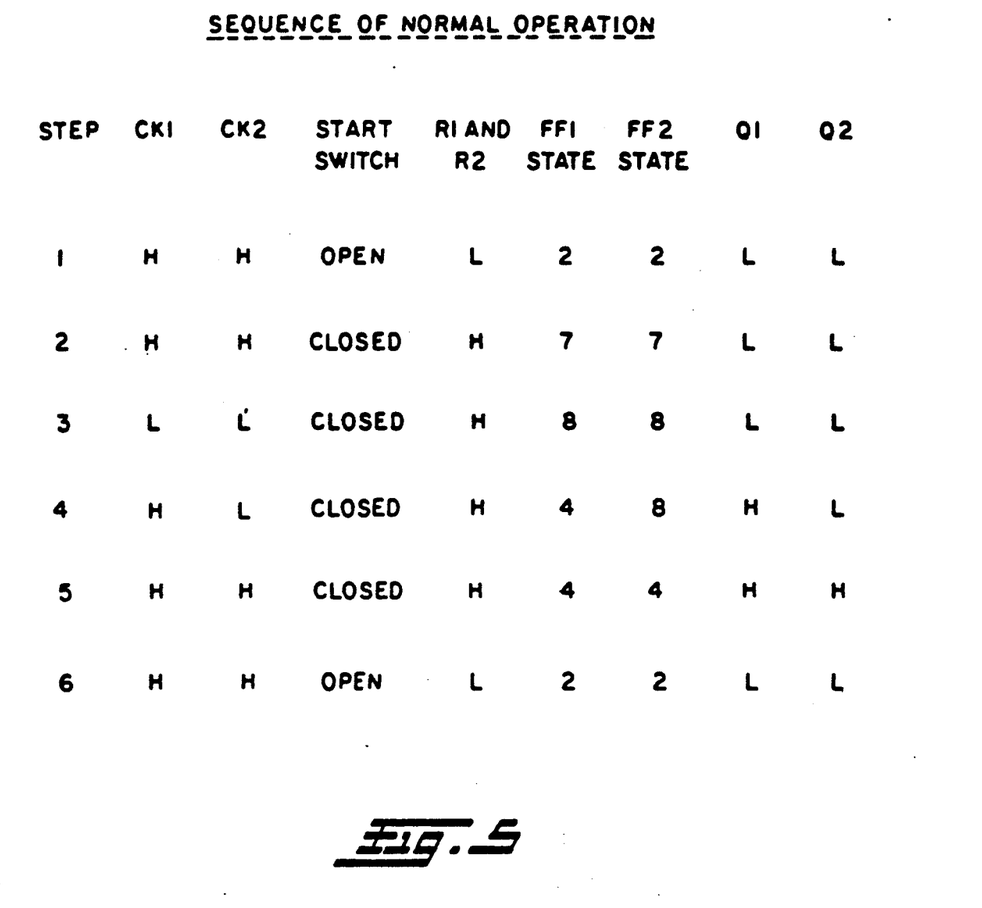
FIG. 5 is a chart of the sequence of normal operation of the first embodiment.

FIG. 5 shows a sequence of normal operation of the first embodiment. At first both clocks CK1, CK2 are high, and both outputs Q1, Q2 are low. The start switch 4' is open so R1 and R2 are low. Both flip-flops are in state 2. With the start switch 4' open, changes of the reset voltage at R1 and R2 cannot clock the chips to change state, as may be seen by comparing states 2 and 7 of FIG. 4.

When the start switch 4 is closed R1 and R2 go high (see step 2 of FIG. 5). Both flip-flops go to state 7. The starter does not operate because Q2 is low.

The method involves communicating information to the ECU 12' that a start-switch signal (from 4') is being provided, and enabling the safety signal (18A, B) to indicate to the interlock (6') that it is safe to start the engine.

If and when the transmission is placed in neutral and the clutch is disengaged, clock 1 and clock 2 both go low, as shown in step 3 of FIG. 5. With the start switch 4' still closed, flip-flops FF1 and FF2 go to state 8. The engine does not start yet because Q2 is still low.

After both FF1 and FF2 go into state 8, in step 3, the microprocessor 36 raises CK1 to high as shown in step 4. With the start switch 4' still closed, FF1 goes to state 4 and FF2 remains in state 8, Q1 is high and Q2 is low.

Q1 is connected via a feedback circuit 38 back to a reset terminal R of the ECU 12', and the high Q1 places the microprocessor 36 in a reset condition. While the constant reset signal exists, the microprocessor 36 is incapable of causing the transmission to shift out of neutral or to cause the clutch to engage. Software within the microprocessor for blocking the shifting is represented on FIG. 2 by a block 38', to which the line 38 is connected. In step 4 of FIG. 5 the output Q2 is still low so the engine cannot start.

In response to step 4 the microprocessor 36 brings CK2 high by means of its internal reset hardware (step 5). With the start switch still closed, Q2 goes high and enables a starter relay (in 8') and a fuel-control motor. The starter motor 10' starts cranking the engine.

After the engine has started the start switch 4' is opened as shown in step 6 of FIG. 5. R1 and R2 go low, placing both FF1 and FF2 in state 2. Q1 and Q2 both go low. The current to the starter motor 10' is stopped by the starter circuitry 8', and the microprocessor 36 is re-enabled.

The normal sequence described above and in FIG. 5 ensures that the microprocessor 36 is reset before the start function is enabled. This prevents spurious triggering of the logic that might otherwise be caused by voltage fluctuations.

If the supply-voltage level decreases when the starter relay closes, and then rises again to nominal VCC as the engine cranks, the sequence might look like FF1 and FF2 are being clocked. However, such an occurrence would merely clock in state 4 again to FF1 and FF2, allowing the starting sequence to continue uninterrupted.

Limited Throttle Control

The preferred first embodiment of FIG. 2 includes limited control of the throttle while the starter motor is cranking the engine to facilitate starting. Details are shown in FIG. 6, but first the concept is described generally. The starter interlock circuit enables or disables the flow of fuel but does not control its amount in a continuous manner. Another circuit, which is not part of this invention, controls the flow of fuel in a continuous manner in response to an input signal received from the driver's foot pedal.

The circuit for enabling or disabling the flow of fuel becomes active after the engine has started cranking and the input voltage has risen high enough for the electronic circuits to be activated. The flow of fuel starts while the engine is still being cranked by the battery-driven starter motor 10' and while the microprocessor 36 is still in a reset condition under the control of the terminal Q1 of FF1 (FIG. 2).

The circuit for enabling or disabling the fuel flow includes subcircuits to sense the position of the driver's foot pedal and the position of an electric throttle actuator. The enablement circuit receives those feedback signals and compares them. When the pedal position is less than the actuator position, the circuit enables an electric motor that controls the throttle actuator.

Please refer to FIG. 6 to follow the details of interconnections and circuit operation that are described here. A throttle pedal 37 is controlled by the operator of the vehicle. Its position is sensed by a potentiometer 39, which is connected between a regulated power supply terminal 41 and a ground terminal 43. An output signal representing the position of the throttle pedal 37 is connected through a resistor 45 to an input-signal-conditioning circuit 47. The output terminal 49 of the input-signal-conditioning circuit 47 is connected on line 9 to terminal TPS of the microprocessor 36.

Another electrical connection is made from the output terminal 49 to a resistive circuit 51 comprising a series resistor 53 and a shunt resistor 55 that serve to limit the maximum travel. The output of the resistive network 51 is connected through a series resistor 57 to a non-inverting input terminal 59 of an operational amplifier 61. A feedback resistor 63 connects to terminal 59 from an output terminal 65 of the operational amplifier 51. Another connection from the output terminal 65 conducts signals to one input 67 of the AND gate 69, which are not shown in FIG. 6 but are shown in FIG. 2.

A throttle actuator 71 is arranged to set the position of the throttle. The throttle actuator 71 has forces on it from a spring 75 and the electric drive motor 73. A potentiometer 77 measures the position of the throttle actuator 71 and provides a corresponding electrical signal at the input of an input-signal-conditioning circuit 79.

Connection is made from an output terminal 81 of the conditioning circuit 79 along the line 11 to the input terminal TAP of the microprocessor 36. Another connection is made from the terminal 81 to a level-shift-and-inversion block 83 of FIG. 6 whose output is connected to an inverting input terminal 85 of the operational amplifier 61.

Inputs to the AND gate 69 are received from terminal Q2 of FF2 and the output terminal 65 of amplifier 61, as described above in connection with FIG. 2. The output of the AND gate 69 is connected to a switching bridge 87 which is used to control the forward and reverse directions of motion of the electric drive motor 73. The switching bridge 87 is also controlled by signals on lines 89 from the microprocessor 36.

The operation of the apparatus of FIG. 6 is as follows: when the position of the throttle actuator 71 is calling for a greater speed than the speed called for by the position of the throttle pedal 37, the signal FLCMD at the terminal 67 of the AND gate 69 is such as to turn off the switching bridge 87 and permit the throttle actuator 71 to be pulled by its spring 75 toward the idle position.

Ordinarily, the electric drive motor 73 operates in opposition to the spring 75 to control the position of a mechanical governor. The signals at line 86 to the switching bridge 87 permit the fuel motor 73 to be turned on in only one direction, namely the direction for advancement of the throttle.

When a signal SE (from Q2) is present on line 66 to one input of the AND gate 69, the AND gate 69 is enabled so that the circuit at FIG. 6 can control the throttle during cranking of the engine.

Second Embodiment

Figure 7:
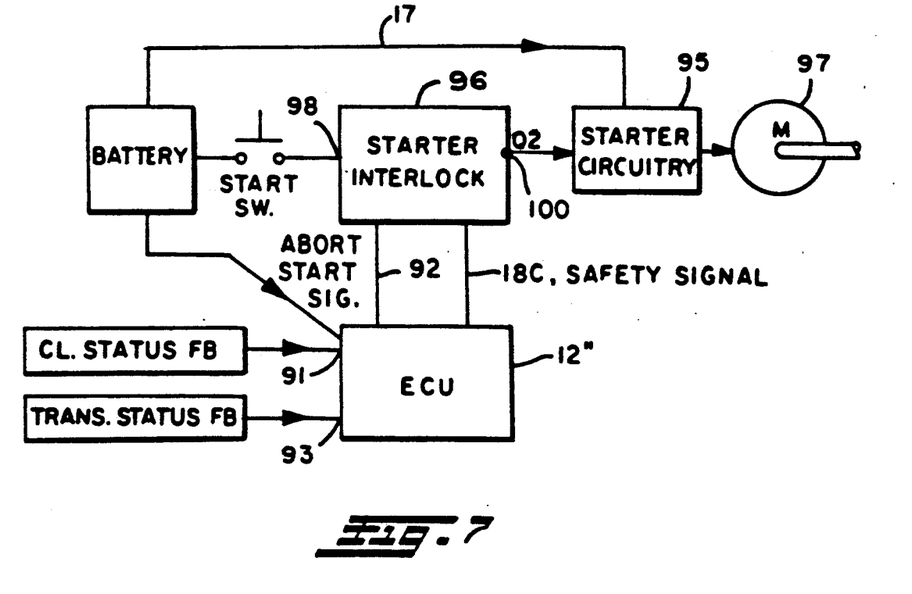
FIG. 7 is a simplified block diagram of a second embodiment of the invention, which permits the monitoring of the statuses of the transmission and clutch even after the starting interlock is latched and cranking is occurring.
Figure 8:
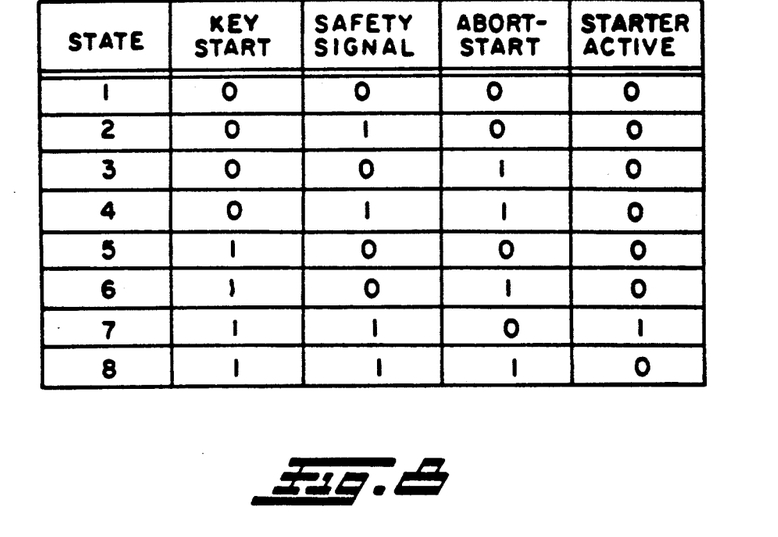
FIG. 8 is a truth table describing the operation of the second embodiment.
Figure 9:
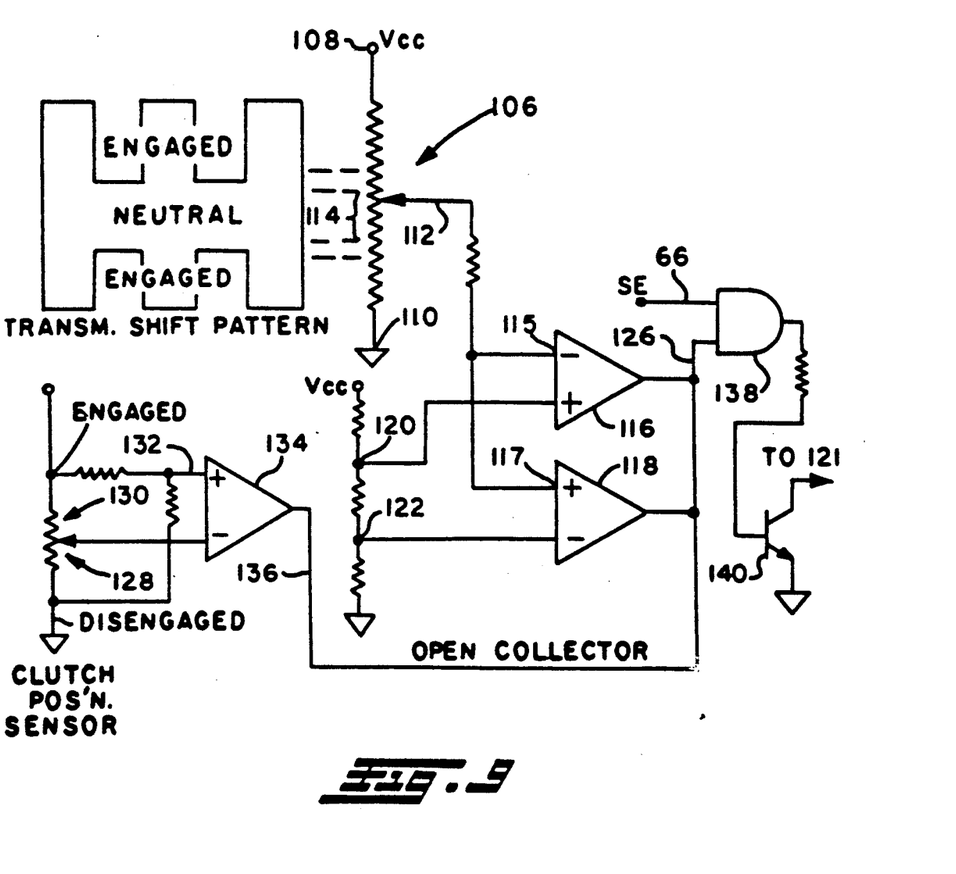
FIG. 9 is a simplified block diagram of a feedback sensor portion of the second embodiment.

In FIGS. 7-9 a second embodiment of the invention is shown that includes continued monitoring of the status of the transmission and clutch while the engine is being cranked by the starter motor. If the status becomes unsafe, cranking is stopped.

FIG. 7 is a simplified drawing showing main blocks that are depicted in more detail on FIG. 2 and including an abort-start signal that is not present on FIG. 2. In FIG. 7 a clutch status signal 91 is connected to an ECU 12''. A transmission status feedback signal is also connected to the ECU 12'', at an input terminal 93. The generation of the clutch and transmission status signals is described in more detail in relation to FIG. 9 below.

The ECU 12'' outputs a safety signal on a line 18C, which is similar to the signal of line 18B, FIG. 2. The signal 18C connects to an interlock circuit 96, which is very similar to the interlock circuit 6' of FIG. 2. Some other lines are not shown in this simplified diagram. Another input to the interlock circuit 96 is a start switch signal at a terminal 98, which is similar to the start switch signal from the start switch 4' in FIG. 2.

An output from the interlock device 96 is the Q2 line 100 that connects to starter circuitry 95 to control a starter motor 97. The elements 95 and 97 correspond to 8' and 10' of FIG. 2. The new element in FIG. 7 is an abort-start signal from the ECU 12'' to the interlock circuit 96 along a line 92. Its function will be explained by means of a truth table of FIG. 8.

FIG. 8 is a truth table of the logic of the second embodiment, and is best understood by simultaneous reference to FIG. 7. The first column of FIG. 8 shows the logic state of the interlock circuit 96. The second column shows the key start signal at terminal 98. The third column is the level of the safety signal 18C. The fourth column is the logic level of the abort-start line 92. The fifth column is the status of the Q2 signal at terminal 100 of FIG. 7.

Whenever the abort-start signal 92 is high, as in states 3, 4, 6 and 8, the starter interlock 96 is disabled, irrespective of the key start signal at terminal 98 or the safety signal at 18C. When the abort-start signal on line 92 is low the starting function is under the control of the other conditions, that is the usual conditions that are described above in connection with FIG. 2.

The states 7 and 8 of FIG. 8 are the additional input of the second embodiment.

FIG. 9 shows a feedback-sensor portion of the second embodiment. Feedback signals are required to indicate the actual conditions of the transmission and clutch. They indicate at least whether or not the transmission is in neutral and the clutch is disengaged.

In FIG. 9, a potentiometer 106 is connected from a regulated power supply terminal 108 to a ground terminal 110. A transfer arm 112 of the potentiometer 106 is mechanically connected with the transmission so as to be positioned in a central sector 114 of the potentiometer 106 when the transmission is in neutral.

A DC signal on the transfer arm 112 is connected through a resistor to the inverting and non-inverting terminals 115, 117 respectively of two operational amplifiers 116, 118. The (other) non-inverting and inverting input terminals of amplifiers are 116, 118 are connected to fixed voltage points 120, 122 on a fixed voltage divider. The outputs of operational amplifiers 116, 118 are connected together on a line 126 and to the reset inputs R1, R2 of the flip-flops FF1 and FF2, terminal 121.

Amplifiers 116 and 118 serve as open-collector comparators. Their outputs are connected (as shown in FIG. 9) to short-circuit the reset terminals R1, R2 to ground when the transmission is not in neutral. As shown in FIG. 4, when R1 and R2 are low the flip-flops FF1 and FF2 are both in state 2 and their outputs Q1, Q2 are low. Since Q2 must be high in order to actuate the start circuitry 8, cranking is stopped whenever the reset line 126 is low. This safety feature stops the cranking of the engine if the transmission somehow gets out of a safe neutral status, after the interlock circuit 6' was latched and had already started the cranking of the engine.

Similarly, a sensor 128, utilizing a potentiometer 130, senses the engaged or disengaged position of the clutch and compares it with a fixed voltage point 132 by means of a comparator 134. When the clutch is disengaged, a logic signal at an output 136 of the comparator 134, which is connected to line 126, holds the reset terminals R1, R2 high. When the clutch is engaged the terminals R1, R2 receive a low signal, which resets the flip-flops FF1 and FF2. The operational-amplifier signals at 126 do not override the inverter to give the appearance of a key start, because the signals at 126 are gated by the signal SE (66, FIG. 2) so that they do not interfere with normal operation. The AND gate 138 and a transistor 140 (FIG. 9) accomplish this.

The second embodiment of FIGS. 7, 8 and 9 causes cranking to stop if the transmission or clutch somehow gets into a condition that would not be safe for the starting of the engine.

Scope of the Invention

While the invention has been illustrated by only a few specific embodiments, combinations of those embodiments and many other forms of the invention are readily apparent. Some of the functions of the invention are controlled by software. The scope of the invention is set forth in the following claims.

We claim:

1. A method for starting an engine of a vehicle, said vehicle having: a transmission; a source of electrical power (2'); an electronic control unit (ECU); starter equipment including a start switch (4'), a starter motor (10') electrically connectable (8') with said source of electrical power, said starter equipment being responsive to a crank command (at Q2) to connect said starter motor with said source of electrical power; comprising the steps of:

actuating said start switch (4') to produce a start-switch signal (at R1, R2);

sensing (14') when said transmission is in neutral and providing a transmission-status signal accordingly;

receiving said transmission-status signal is said ECU (12'), and providing in response thereto a first safety signal (at 18A);

receiving said start-switch signal (at R1) and said first safety signal (at CK1) in a first interlock device (FF1) and responding thereto by latching said first interlock device so as to provide therefrom a first output signal (at Q1);

receiving said first output signal at said ECU (at R) and responding thereto by resetting said ECU to a disabled condition, said disabled condition being characterized by including a second safety signal (at 18B);

receiving said second safety signal (at CK2) in a second interlock device (FF2) and responding thereto by latching said second interlock device so as to provide therefrom a second output signal (at Q2) to serve as a crank command;

receiving said crank command (Q2) at said starter equipment (8', 10'), whereby to start said engine.

2. A method as in claim 1 and wherein said step of receiving said first output signal and resetting said ECU to a disabled condition further comprises resetting to a disabled condition characterized by blocking (38') said ECU from commanding said transmission to change its status.

3. A method as in claim 2 and further comprising a step, following said step of receiving said second safety signal (at CK2) and responding thereto so as to provide therefrom a second output signal (at Q2), of:

receiving said second output signal in a throttle control device to enable advancement-only control of a throttle while said crank command is maintained.

4. A method as in claim 1 and further comprising, concurrent with all of said steps, a step of supplying power for said first and second interlock devices (FF1, FF2) through a first DC power path (34, 23, 25') derived from said source of electrical power and from a second DC power path (4', 33, 37), and drawing said power from said second DC power path only when the voltage from said first DC power path is lower than the voltage from said second DC power path;

whereby to maintain said crank command despite reduction of voltage of said power source during cranking.

5. A method as in claim 1 and comprising the step, following said step of receiving said second safety signal (at CK2) and latching said second interlock device (FF2) so as to provide a crank command of:

continuing to sense (93) whether said transmission is in neutral during said crank command, and resetting (at 121) at least said second interlock device (FF2) so as to stop said crank command if the transmission's status becomes non-neutral.

* * * * *